United States Patent
Balachandra et al.

(10) Patent No.: US 9,387,655 B2
(45) Date of Patent: Jul. 12, 2016

(54) NANO-ENGINEERED STRUCTURAL JOINTS: MATERIALS, PROCEDURES AND APPLICATIONS THEREOF

(71) Applicants: Anagi Manjula Balachandra, Okemos, MI (US); Parviz Soroushian, Okemos, MI (US); Mohammad Sayyar Bidgoli, Lansing, MI (US)

(72) Inventors: Anagi Manjula Balachandra, Okemos, MI (US); Parviz Soroushian, Okemos, MI (US); Mohammad Sayyar Bidgoli, Lansing, MI (US)

(73) Assignee: METNA CO., Lansing ( * ) Notice: Subject to any disclaimer, the term of this patent is extended or adjusted under 35 U.S.C. 154(b) by 540 days.

(21) Appl. No.: 13/854,182

(22) Filed: Apr. 1, 2013

(65) Prior Publication Data

US 2015/0375490 A1    Dec. 31, 2015

(51) Int. Cl.
| | |
|---|---|
| *B32B 37/24* | (2006.01) |
| *B32B 37/12* | (2006.01) |
| *B29C 65/00* | (2006.01) |
| *B32B 37/06* | (2006.01) |
| *B82Y 30/00* | (2011.01) |

(52) U.S. Cl.
CPC ............. *B32B 37/1284* (2013.01); *B29C 65/00* (2013.01); *B32B 37/06* (2013.01); *B32B 37/24* (2013.01); *B32B 2037/1246* (2013.01); *B32B 2037/243* (2013.01); *B82Y 30/00* (2013.01); *Y10S 977/847* (2013.01); *Y10T 428/12444* (2015.01)

(58) Field of Classification Search
CPC ............ B82Y 30/00; Y10T 428/12444; Y10S 977/742; Y10S 977/847
USPC ............. 156/298, 306.6, 306.9, 307.3, 307.5, 156/309.6
See application file for complete search history.

(56) References Cited

U.S. PATENT DOCUMENTS

| | | | |
|---|---|---|---|
| 5,127,969 A | 7/1992 | Sekhar | |
| 7,056,409 B2 | 6/2006 | Dubrow | |
| 7,378,040 B2 * | 5/2008 | Luo | B82Y 10/00 156/60 |
| 2009/0068387 A1 * | 3/2009 | Panzer | B32B 37/02 428/40.1 |
| 2009/0186238 A1 | 7/2009 | Bampton | |

OTHER PUBLICATIONS

Faulkner, S. D., Y. W. Kwon, et al. (2009). "Study of composite joint strength with carbon nanotube reinforcement." Journal of Materials Science 44(11): 2858-2864.

(Continued)

*Primary Examiner* — Scott W Dodds

(57) ABSTRACT

A method of joining two articles through a nano-enhanced joining medium is described. Nanomaterials are applied to the surfaces of sheets made of the joining medium via casting or spraying. Said sheets with nanomaterial coatings are then placed between the joining surfaces of the articles, and then application of pressure and heating is used to form a nano-engineered structural joint at the interface of said articles. The distinctly high specific surface area of nanomaterials and the energetic preference of their functionalized surfaces for bonding facilitate the joining process. Nano-engineered structural joints complement high strength levels with desired toughness and the compliance needed for accommodating deformation (e.g. thermal expansion) mismatches of joined articles without generating high stress levels near their interface. The limited quantity (per unit joint surface area) of nanomaterials utilized in nano-engineered joints benefits their economic viability.

6 Claims, 8 Drawing Sheets

(56) References Cited

OTHER PUBLICATIONS

Park, S. W. and D. G. Lee (2009). Adhesive joint strength of glass/epoxy composites surface-treated with nano-size carbon black. 17th International Conference on Composite Materials, ICCM-17, Jul. 27-31, 2009, Edinburgh, United kingdom, International Committee on Composite Materials.

Han, Y., H. Jing, et al. (2012). "Interfacial reaction and shear strength of Ni-coated carbon nanotubes reinforced Sn—Ag—Cu solder joints during thermal cycling." Intermetallics 31: 72-78.

Bukat, K., J. Sitek, et al. (2012). "SAC 305 solder paste with carbon nanotubes—Part I: Investigation of the influence of the carbon nanotubes on the SAC solder paste properties." Soldering and Surface Mount Technology 24(4): 267-279.

* cited by examiner

NANO-ENGINEERED STRUCTURAL JOINTS: MATERIALS, PROCEDURES AND APPLICATIONS THEREOF

STATEMENT REGARDING FEDERALLY SPONSORED RESEARCH & DEVELOPMENT

This invention was made with U.S. government support under Contract FA8650-07-C-3704 by the U.S. Air Force. The U.S. government has certain rights in the invention.

CROSS-REFERENCE RELATED TO THIS APPLICATIONS

Not applicable.

BACKGROUND

Prior Art

The following is a tabulation of some prior art that presently appears relevant:

U.S. Patents

| Pat. No. | Kind Code | Issue Date | Patentee |
| --- | --- | --- | --- |
| U.S. Pat. No. 5,127,969 | A | 1992 | Sekhar |
| U.S. Pat. No. 7,056,409 | B2 | 2006 | Dubrow |

U.S. Patent Application Publications

| Application Number | Kind Code | Publication Date | Applicant |
| --- | --- | --- | --- |
| 2009/0186238 | A1 | 2009 | Bampton |

NON PATENT LITERATURE DOCUMENTS (1) Faulkner, S. D., Y. W. Kwon, et al. (2009). "Study of composite joint strength with carbon nanotube reinforcement." *Journal of Materials Science* 44(11): 2858-2864.
(2) Park, S. W. and D. G. Lee (2009). *Adhesive joint strength of glass/epoxy composites surface-treated with nano-size carbon black.* 17th International Conference on Composite Materials, ICCM-17, Jul. 27, 2009-Jul. 31, 2009, Edinburgh, United kingdom, International Committee on Composite Materials.
(3) Han, Y., H. Jing, et al. (2012). "Interfacial reaction and shear strength of Ni-coated carbon nanotubes reinforced Sn—Ag—Cu solder joints during thermal cycling." *Intermetallics* 31: 72-78.
(4) Bukat, K., J. Sitek, et al. (2012). "SAC 305 solder paste with carbon nanotubes—Part I: Investigation of the influence of the carbon nanotubes on the SAC solder paste properties." *Soldering and Surface Mount Technology* 24(4): 267-279.

FIELD OF INVENTION

The present invention relates to fabrication of joints between articles through nano-reinforced bonding media. Reinforcement is achieved through enhanced specific surface area and surface free energy of the nanomaterials, which facilitate strong physical and chemical interactions between nanomaterials and the bonding media. This approach to joining applies to metals, metal matrix composites, ceramics, ceramic matrix composites, polymers, polymer matrix composites, and carbon composites.

BACKGROUND OF THE INVENTION

Joints critically influence the performance of structures and other systems; ineffective and inefficient joining commonly undermines the gains in performance or efficiency which would be otherwise realized with advanced materials and structural systems. The anisotropy, structural complexity and sensitivity of advanced materials (including composites) increasingly challenge conventional joining techniques. Advances in materials science and engineering have made available a growing variety of fundamentally different materials with distinct balances of performance characteristics; optimum performance is thus achieved in the context of hybrid structures comprising different materials that are joined together. The incompatibilities in physical, chemical and mechanical properties of different materials used in hybrid systems pose new challenges to joining processes. Modern designs push advanced materials (and structures) to new limits, challenging the capabilities of traditional joining methods. Many advanced materials are also inherently sensitive to secondary processing during manufacturing; their microstructure and properties can thus be compromised during joining. Growing demands for improved joining methods have also been created by the increasing emphasis on multifunctional structures, automated manufacturing techniques, nondestructive evaluation (for quality assurance and health monitoring), and environmentally friendly practices. In spite of these growing challenges, joining has not fundamentally changed over decades. It continues to be the last step in product manufacturing; too frequently an after-thought, and almost always a 'means to an end' that is expected to detract from (rather than add to) the material or system performance. At the most fundamental level, all joining methods rely on mechanical, chemical and/or physical forces. These forces are currently used by three principal joining methods: (i) mechanical fastening (and integral attachment); (ii) adhesive bonding; and (iii) welding (including soldering, brazing). Present invention can be viewed as a new class of joints which seek to employ the unique qualities of nanomaterials towards development of high-performance and versatile joints between diverse material types. This invention can also be viewed as improvements in traditional joining techniques.

U.S. Pat. No. 7,056,409 B2 to Dubrow, et al, disclosed a method to couple and/or join articles or materials via introducing silicon nanofibers into the substrate surfaces. The layer of nanofibers form coupling interactions with the surfaces, thus, joining/adhering them together. Introduction of the nanofibers between the surfaces is optionally accomplished by providing the fibers covalently coupled to a first surface (e.g., by growing nanofibers directly on the first surface, or by covalently attaching the fibers to the first surface), followed by mating the fiber-covered surface with a surface of a second article or material.

Unlike the methods disclosed above, the present invention relies upon reinforcing the joining medium (e.g., brazing alloy or polymer-based adhesive film) with carbon nanotubes while concurrently establishing bonds. These concurrent phenomena yield joints with enhanced strength and ductility.

U.S. Patent Application Publication No. US 2009/0186238 A1 to Bampton disclosed a method of fabricating a brazed article incorporating nano-grained aluminum alloy with a braze filler material having a composition that is compatible with the composition of the nano-grained aluminum alloy. Thus, the braze filler material forms a strong joint and allows the nano-grained aluminum alloy to be used in brazed articles such as heat exchangers. The method presented here is based on using carbon nanomaterials which benefit bonding and render beneficial reinforcement effect at the interface between the brazing alloy, as the joining agent, and the substrates. Further, use of nanomaterials s increases the thermal and electrical conductivity of brazed joints.

U.S. Pat. No. 5,127,969 to Sekhar, et al. disclosed a process for preparing a composite solder, brazing or welding material with enhanced mechanical and thermal performance. The process comprises melting the metal or alloy, cooling the metal or alloy to a semi-solid state, and adding a reinforcing material to the metal or alloy during the cooling step. It results in a composite material where the reinforcements is in particulate or fibrous form, and comprises at least one of graphite, silicon carbide, and metal oxide. The above-mentioned patent differs from the present invention which incorporates nanomaterials to reinforce the bonding medium, and does not require several steps to prepare the joining medium.

Early approaches to the use of nanomaterials in bonding media used carbon nanotubes (CNT) in carbon fiber epoxy composites (Faulkner, Kwon et al. 2009), and carbon black in glass/epoxy composites (Park and Lee 2009). While these approaches increased the joint strength, there was no chemical bond formation between nanomaterials and the epoxy matrix; this led to poor load transfer between nanomaterials and the bonding medium. Han et al. demonstrated the use of Ni-coated carbon nanotubes in 95.8Sn-3.5Ag-0.7Cu solder joints (Han, Jing et al. 2012); Ni-coated CNTs were, however, dry blended with matrix, with no additional steps taken to disperse Ni-coated CNTs in the alloy matrix. This technique is labor-intensive as it requires prior extrusion. The solder containing silver particles and modified carbon nanotubes exhibited higher mechanical performance than plain solder (Bukat, Sitek et al. 2012). Interactions between Ag and CNT, however, were weak due to surface incompatibilities, thus compromising load transfer between the CNTs and the Ag matrix. In order to improve interfacial interactions, appropriate surface coatings or compatible surface functionalities needed on nanomaterial surfaces. None of these references or prior inventions emphasize chemical bond formation between nanomaterials and the bonding medium.

BRIEF SUMMARY OF THE INVENTION

The present invention entails a method of producing nano-engineered structural joints through effective use of slender nanomaterials in the joining medium to improve the performance of structural joints. Current invention discloses a method of joining two or more articles via slender nanomaterials embedded in a joining medium and interlinked together. This method involves: (i) dispersion of nanomaterials comprising at least one of carbon nanotubes and nanofibers within a solvent with the weight percent of said nanomaterials relative to the solvent ranging from 0.001% to 10%; (ii) application of a coating of said solvent incorporating dispersed nanomaterials on at least one of the surfaces of the joining surfaces of the said articles or at least one of the two sheets of the joining medium using at least one of spraying and casting methods, with said sheets of the joining medium made of at least one of brazing alloys, thermoplastics and thermoset precursors, and heating the applied solvent incorporating nanomaterials in order to evaporate the solvent; (iii) inserting the two sheets of the joining medium between joining surfaces of the two articles, with at least one surface coated with nanomaterials interfacing the two sheets; (iv) pressing the joining surfaces with sheets inserted between them against each other, and heating the joining surfaces in order to liquefy the joining medium to wet the joining surfaces of said articles, partially or fully embed the nanomaterials within the liquefied medium, and develop at least one of physical and chemical bonds with the surfaces of joining articles and nanomaterials; and (v) cooling the joining surfaces of said articles in order to form a solid joining medium that is bonded to the joining surfaces of said articles, and is enhanced by interlinked nanomaterials which are partially or fully embedded in and bonded to said no joining medium.

The method disclosed in present invention, uses dispersion of a slender nanomaterials in a solvent, herein used nanomaterials are at least one of carbon nanotubes, carbon nanofibers, metal coated carbon nanotubes, and metal coated carbon nanofibers.

The method disclosed in present invention, wherein said articles are made of at least one of metals, metal matrix composites, ceramics, ceramic matrix composites, polymers, polymer matrix composites, and carbon.

The method disclosed in present invention, wherein said solvent incorporating dispersed nanomaterials are at least one of carbon nanotubes, carbon nanofibers, metal coated carbon nanotubes, and metal coated carbon nanofibers.

One of the novel features of the current invention is: surfaces of slender nanomaterials are tailored or modified in order to facilitate their dispersion and promote their interfacial interactions. The surfaces of the said nanomaterials are tailored or modified by at least one of chemically bonded functional groups and coatings applied via electroless deposition. Wherein said functional groups are at least one of hydroxyl and carboxyl groups. The coating applied via electroless deposition comprises at least one of copper, nickel and silver.

The present invention improves the adhesion capacity beyond that realized by physical interactions, through chemical reactions involving nanomaterials, the joining medium and the joining surfaces, while providing the joining medium with effective nano-scale reinforcement. The present invention also improves the adhesion between nanomaterials via fusion and/or chemical reaction at their contact points. The improved bonding of all system constituents enables effective use of the distinct qualities of nanomaterials towards development of joints with a desired balance of strength, deformation capacity, toughness, thermal stability, weathering resistance, electrical and thermal conductivity, and other characteristics.

BRIEF DESCRIPTION OF THE SEVERAL VIEWS OF THE DRAWINGS

Accompanying drawings help with explaining the invented nano-engineered structural joints, materials and procedures for making them, and their applications and performance. The accompanying drawings are only for the purpose of illustrating the embodiments of the invented methods, and not for the purpose of limiting the invention.

DETAILED DESCRIPTION OF THE INVENTION

Figure 1:
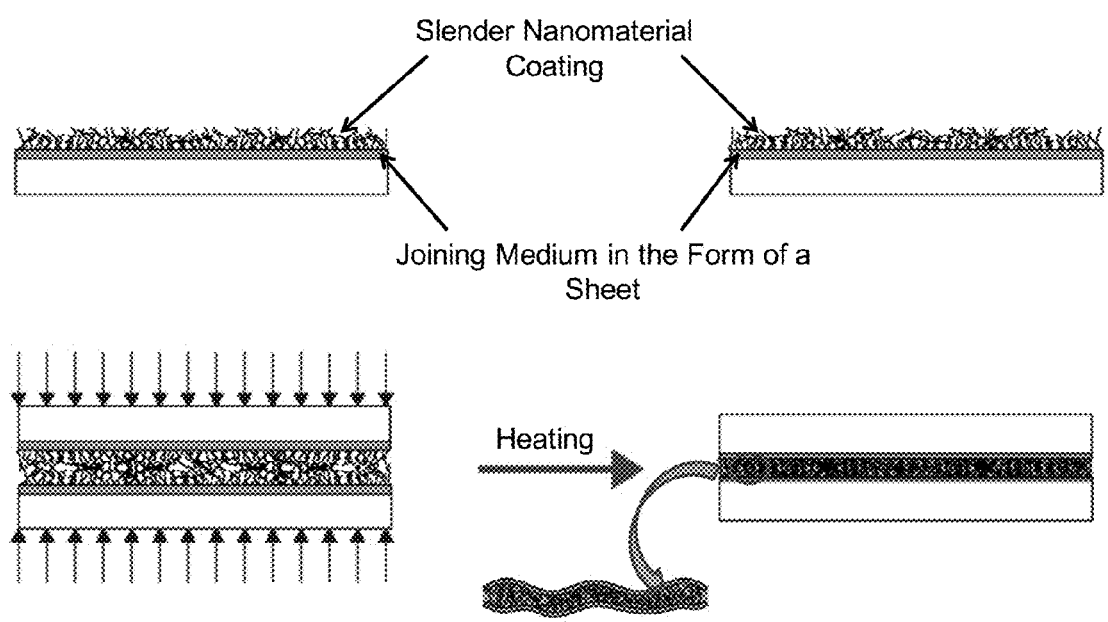
FIG. 1. Schematic representation of the joint fabrication process.

Joints are the weak link in many applications; furthermore, their long-term instability and high maintenance costs are major drawbacks in many fields of applications. Fabrication of nano-engineered joints relies upon utilization of slender graphite nanomaterials (carbon nanofiber and multi-walled carbon nanotube) as a reinforcement agent which enhance the joint performance. Nano-engineered joints draw upon the unique qualities of nanomaterials to achieve a highly desired (and versatile) balance of engineering properties. The nano-scale geometry and the distinctly high surface area of nanomaterials strongly influence their performance characteristics. Furthermore, use of slender nanomaterials provides the joint with desired conformability for control of stresses associated with thermal expansion mismatch of the joined surfaces.

While the unique features of nanomaterials provide a promising basis for development of nano-engineered joints, one major challenge associated with the use of graphite nanomaterials is the strong van der Walls attraction between the distinctly high surface area of nanomaterials, which hinder their uniform dispersion in the joining medium, affecting utilization of their unique properties. A novel feature of the current invention involves tailoring of the surfaces of nanomaterials in order to facilitate their thorough dispersion and interfacial bond formation within the joining medium.

Slender nanomaterials are introduced onto the joining surfaces by spraying a dispersion of nanomaterials on the joining surfaces of articles to be bonded. If the joining medium is in the form of a sheet, nanomaterials are sprayed on to the surfaces of the sheet. The joining surfaces of said articles are pressed against each other. The assembly is then heated so that the joining medium establishes primary bonds with the joining surfaces of said articles and also with the nanomaterials, and nanomaterials establish primary bonds within themselves and also with the joining surfaces of said articles. The primary interfacial bonds formed between the tailored surfaces of nanomaterials with the joining medium, joining surfaces of said articles and other nanomaterials effectively reinforce the joining medium and interlink the joined surfaces of said articles towards enhancement of the joint performance. The surfaces nanomaterials are been tailored (or modified) to facilitate the dispersion as well as promote their interfacial interactions through either chemical bonded functional groups or a coating applied via electroless deposition. Chemical bonded functional groups involve at least one of hydroxyl and carboxyl groups through chemical reactions. The coatings produced by electroless deposition comprise at least one of copper, nickel and silver. This approach to joining takes advantage of the distinctly high surface area of nanomaterials, which are tailored for chemical bond formation between nanomaterials and the joining medium and also between the nanomaterials themselves. The uniquely high strength, ductility, modulus and fatigue life of nanomaterials (as well as their long-term stability) benefit the strength, impact resistance, fatigue life and durability of the joint. The particular thermal attributes of nanomaterials could enable processing of joints with only moderate temperature rise, which lowers processing expanses and favors application of the method towards joining of broader categories of substrates. The limited quantity (per unit bond area) of nanomaterials used in this approach to joining greatly benefits the economic viability of the approach.

Having described the invention, the following examples are given to illustrate specific applications of and provide a better understanding of the invention. These specific examples are not intended to limit the scope of the invention described in this application.

Example 1

Development and Experimental Evaluation of Nano-Engineered Joints Between Fiber Reinforced Thermoplastic Matrix Composites Materials Glass fiber polypropylene (Glass PP), a thermoplastic polypropylene matrix with unidirectional glass fiber reinforcement, with 1.49 g/cm$^3$ density and 200-220° C. melt temperature was purchased in the form of 6 mm thick plates from Baycomp. Solvents used for nanomaterial dispersion were purchased from Aldrich. Micro-90 solution (concentrated cleaning solution) was purchased from Cole-Parmer Instrument Co., Vernon Hills, Ill. Multi-walled, carboxylic acid (COOH) functionalized carbon nanotubes (CNT) with 15±5 nm diameter and 5-20 μm length were purchased from NanoLab Inc.

Fabrication of Nano-Engineered Joints

The glass PP plates were sonicated for 15 minutes in micro 90 solution (1 vol. %), rinsed thoroughly with deionized (DI) water, and sonicated for 15 minutes in DI water. The plates were further sonicated for 15 minutes in ethanol, and then air-dried. Finally, all plates were subjected to UV/ozone treatment for 15 minutes just prior to deposition of CNT dispersion.

Deposition of CNT Mats on Glass PP Surfaces Via Solvent Casting

Figure 2:
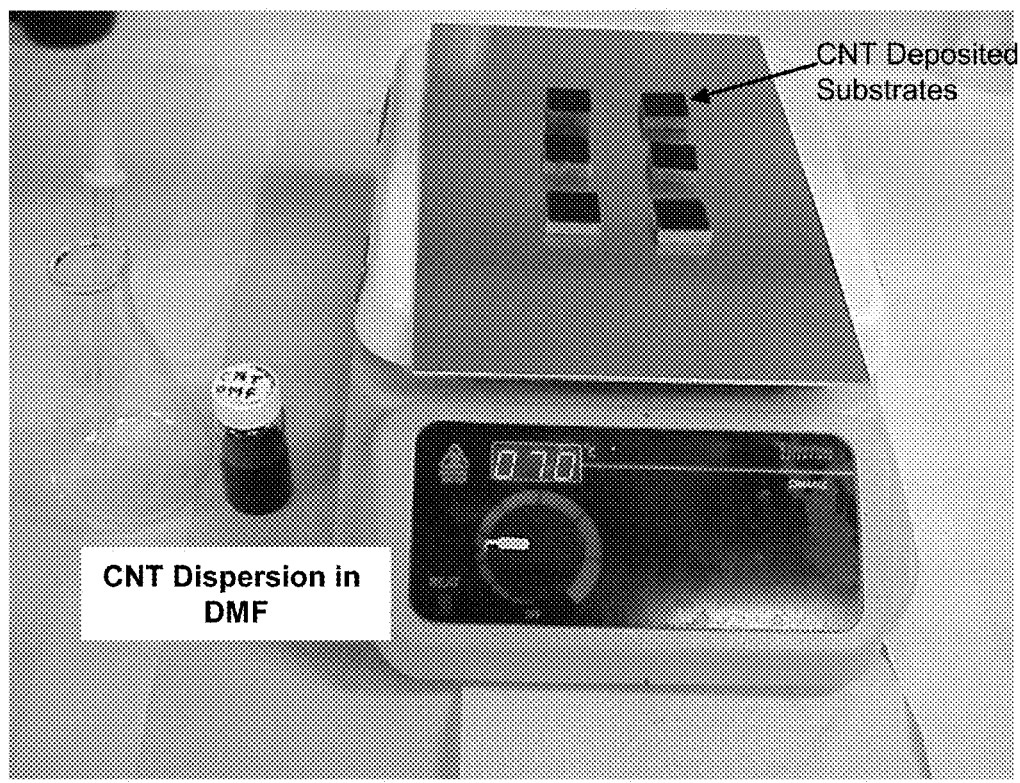
FIG. 2. CNT dispersion in DMF, and glass PP plates with Different CNT layers deposited on their surfaces by solvent-casting.

A simple solvent-casting procedure was employed to introduce a CNT mat at the joining interface. Briefly, this process comprises repeated implementation of two steps: (1) introduction of the 0.3% (by weight) CNT dispersion in water (or ethanol) on the joining surface (via drop casting) of the said articles; and (2) evaporation of the solvent through air-drying with the help of a hot plate (at 65° C.). These two steps were repeated to produce a targeted CNT mat thickness; the resulting mat thickness was estimated through measurement of weight gain after deposition of the nanotube mat. FIG. 2 shows the CNT dispersion in ethanol, and glass PP plates with different number of CNT layers deposited.

Glass PP plates were pressed against each other (with deposited CNT mats facing each other). The assembly was placed in a stainless steel mold, and subjected to a pressure of 750 KPa using screws and compression springs. The pressed setup was transferred to a furnace that was pre-heated to 266°

C., and was kept at that temperature for 25 minutes. It was then allowed to cool down to room temperature over 25 minutes (under pressure). The resulting joint was removed from the mold, and subjected to mechanical testing.

Figure 3:
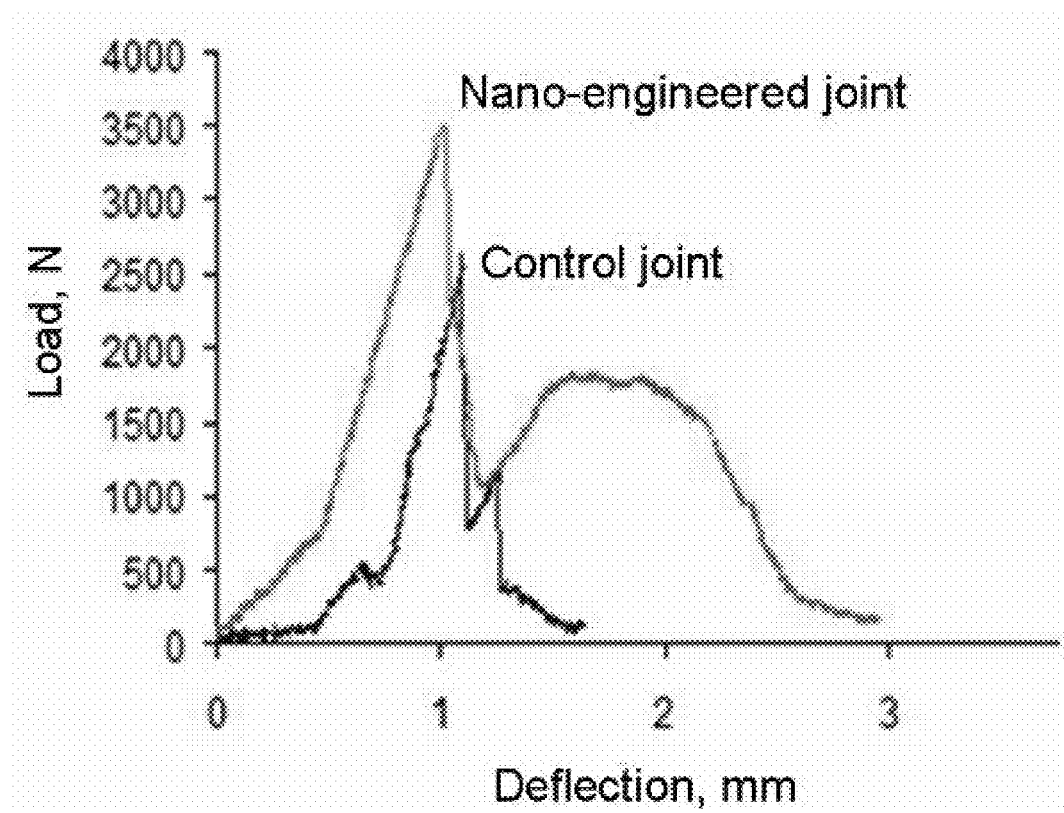
FIG. 3. Typical shear load-deflection curves for nano-engineered and control joints between thermoplastic composites.

Single-lap shear tests were performed on 20 mm×20 mm nano-engineered thermoplastic composite joints processed via heating, and also on control joints processed similarly but without introduction of nanomaterials at the interface. Typical shear load-deflection curves obtained for nano-engineered and control joints are presented in FIG. 3, where the nano-engineered joint is observed to provide improved levels of ductility (deformation capacity), toughness (energy absorption capacity) and strength. Nano-engineered joints provided 30% higher shear strength when compared with the control joints fabricated similarly but without nanomaterials. The gains in strength and ductility were realized with a relatively low consumption of CNT at the joint; the CNT mat thickness was only 1.6 micrometer at the joining interface.

Example 2

Development and Experimental Evaluation of Nano-Engineered Joints Between Fiber Reinforced Thermoset Matrix Composites This example covers nano-engineered joints fabricated utilizing CNT reinforced thermoplastic adhesive film as the bonding medium. The adhesive film was applied to the joining surface of composite, and the CNT mat was deposited upon the adhesive film. The joining surfaces (with one or both carrying adhesive film coated with nanotube mat) of the said articles were pressed against each other and then heated. Upon heating, the adhesive film melts and wets CNTs and the substrate surfaces. Upon cooling, solidification of the thermoplastic adhesive medium leads to joint formation. Heating induces strong covalent bond formation at functionalized CNT contact points with the adhesive medium. The joining process was carried out in vacuum to achieve good consolidation.

Materials

Carbon fiber epoxy sheets with 50 vol. % carbon fiber were purchased from Alfred Associates. These composite sheets are orthotropic laminates with woven 0°/90° carbon fiber reinforcement. A textured finish is provided on both sides of composite sheets to improve their bonding qualities. The polyester adhesive films used were purchased from Adhesive Film, Inc. with 0.003 inch (0.075 mm) thickness and 135° C. melt temperature. The solvents N,N Dimethyl formamide (DMF, Reagent Plus 99%), 2-propanol (IPA, 99.5% A.C.S. reagent) and ethanol were purchased from Aldrich. Multi-walled, carboxylic acid (COOH) functionalized carbon nanotubes (15±5 nm diameter and 5-20 μm length) were purchased from NanoLab Inc.

Cleaning of Composite Sheet Surfaces

Composite sheets were sonicated in IPA for 15 minutes, and then air-dried for 30 minutes. The sheets were subsequently heated in furnace at 120° C. for 1 hour.

Fabrication of Joints

Figure 4:
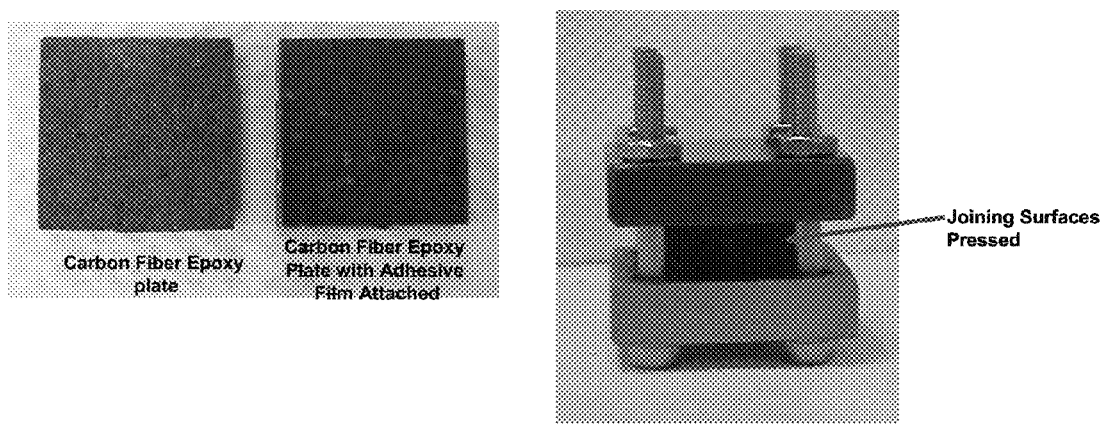
FIG. 4. Fabrication of nano-engineered joints between thermoset substrates using adhesive films.

Nano-engineered joints between thermoset composites were formed using thermoplastic adhesive films with 5, 10 and 15 layers of CNT deposited on the joining interface. The joint is fabricated in the following steps: (i) attachment of adhesive films to the thermoset composite sheet; (ii) spray of CNT mats on the adhesive films; and (iii) joint formation through pressing of the joining surfaces against each other followed by heating the assembly (FIG. 4). In step (i), the adhesive film with protective sheet on its surface was placed on the joining surface, pressed against it using a stainless steel mold, and placed in a pre-heated vacuum oven (190° C.) for 20 minutes, allowed to cool down to room temperature under vacuum, and then the protective sheet was removed from the adhesive film. Step (ii) involved solvent casting of the nanotube mat on the adhesive film surface, which followed the procedures described in Example 1 for solvent casting of nanotube mat against different surfaces. Finally, step (iii) involved placing the two nanotube mats deposited on adhesive films against each other, pressing the assembly in the same stainless steel mold, and implementation of the heating and cooling procedures described earlier.

The shear test results produced with control and nano-engineered joints between thermoset substrates showed that introduction of nanomaterials at the interface enhanced the ductility of joints formed between thermoset composites.

Example 3

Nano-Engineered Joining to Improve the Interlaminar Strength of Thermoset Composites Laminated thermoset matrix composites are susceptible to delamination under impact and under service loads. This example reviews the application of nano-engineered joining technology towards enhancement of the interlaminar strength of thermoset matrix composites. Nano-engineered thermoset matrix composite laminates were fabricated with nanomaterials introduced at the interlaminar interfaces of a prepreg layup for enhancement of the cured composite damage resistance. Control specimens prepared similarly but without introduction of nanomaterials were also evaluated Materials Unidirectional carbon fiber epoxy prepregs with 65% fiber volume fraction and single laminate thickness of 0.140 mm were used in this experimental work. The prepreg tapes were purchased from The Composite Store, Inc. Multiwalled, carboxylic acid (COOH) functionalized carbon nanotubes (15±5 nm diameter and 5-20 μm length) were purchased from Nano-Lab Inc.

Specimen Preparation

Each specimen was fabricated using cross-ply carbon fiber reinforced epoxy composites $(0/90)_5$ comprising a total of 10 plies. In the case of nano-engineered composites, carbon nanotube mats of 10 μm thickness were introduced at the interfaces between all plies. For this purpose, a dispersion of carboxylic acid functionalized multi-walled carbon nanotubes in ethanol was sprayed on the ply surface followed by air-drying of ethanol; this spray and drying process was repeated few times until the targeted nanotube mat thickness was produced.

Figure 5:
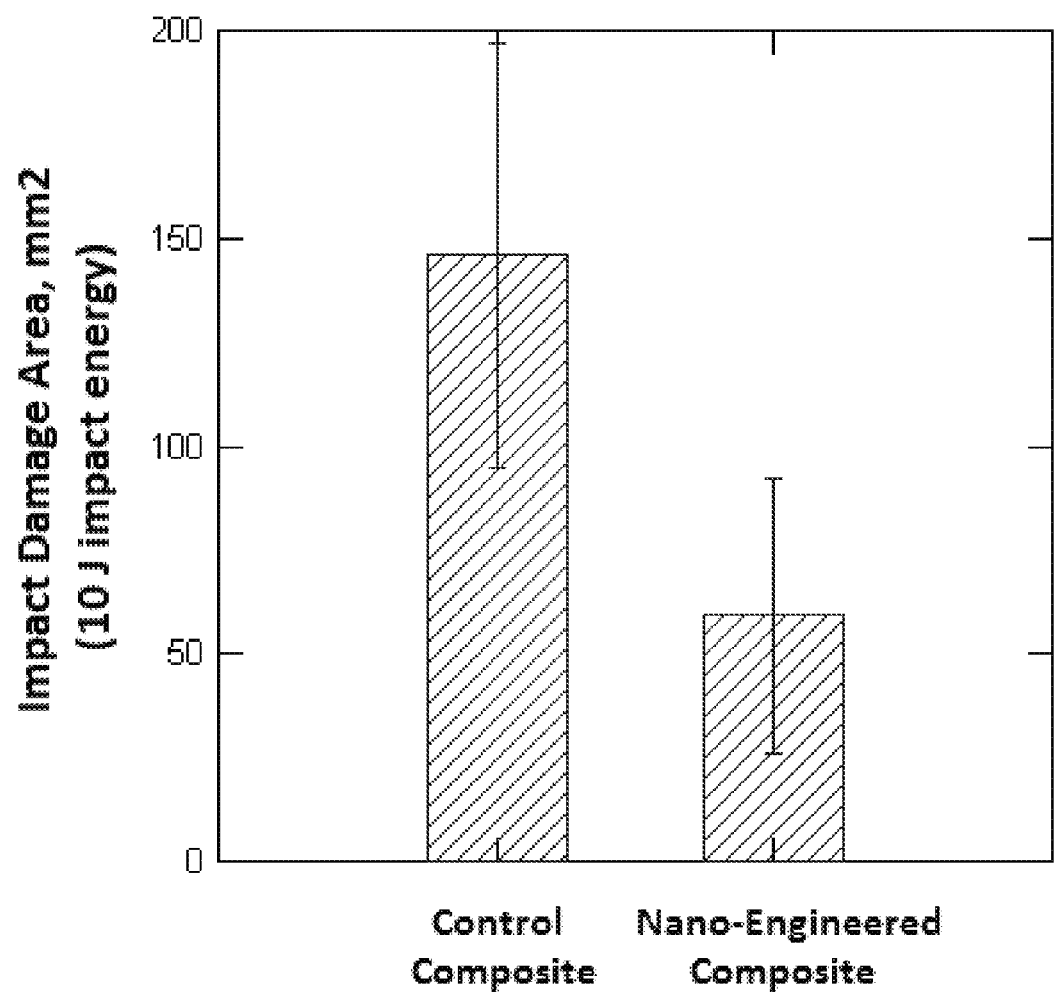
FIG. 5. Impact test results for control and nano-engineered thermoset matrix composites.

Curing was performed in a hot hydraulic press under a sustained pressure of 400 KPa, following the prepreg manufacturer's recommended procedure. This procedure involved initial heating to 90° C. at a rate of 3.33° C./min, retaining the 90° C. temperature over 20 minutes to allow for escape of any trapped air or gas, raising the temperature to 135° C., retaining the 135° C. temperature over 1 hour, and cooling to 120° C. in the hot press. The resulting composite laminated were subjected to impact tests. The impact test specimens were 1.5 mm thick with 135 mm×135 mm planar dimensions. Control impact test specimens were prepared similarly but without introduction of carbon nanotubes at the interfaces. Impact test indicated that introduction of nanomaterials at the interface reduced the impact damage area by 68% under 10 J impact energy (FIG. 5). All control specimens failed under 15 J of impact energy, while only one out of five nano-engineered composites failed under this impact energy. Susceptibility to damage under impact is a major drawback, noting that propagation of the impact damage in service (e.g., under fatigue loads) compromises the reliability of composite structures. Thus improved impact energy in the presence of carefully tailored nanomaterials at the joining interfaces is beneficial to aerospace industry and other applications of fiber reinforced composite laminates.

Example 4

Development and Characterization of High-Temperature Metal-to-Metal Nano-Engineered Joints Materials Titanium plates were purchased from Titanium Processing Center, and were sheared into 2 cm×2 cm pieces; they were chemically etched to remove the oxide layer prior to introduction of nanomaterials. The multi-walled carbon nanotubes used for preparation of high-temperature joints were 200 micrometer in length and 15 nm in diameter with a thin surface coating of copper obtained via electroless deposition. These long, copper-coated nanotubes are referred to as L-CuCNT, and were purchased from NanoLab Inc. Copper nanoparticles (CuNP, <100 nm particle size, 99.8% trace metals basis), hydrofluoric acid (HF), nitric acid ($HNO_3$), ethanol, and isopropanol (IPA) were the other materials used in development of high-temperature joints, all of which were purchased from Aldrich. Brazing alloy sheets Cusil® (63% Ag, 35.25% Cu with a thickness of 25 micrometer) and Cusil ABA® (63% Ag, 35.25% Cu, and 1.75% Ti with 50 micrometer thickness) were purchased from Wesgo metals.

Fabrication of Joints

In brazing, it is generally important that the surfaces to be brazed are free from contamination and oxides, which can lead to poor wetting and bonding. When the surfaces are cleaned and free of the oxide layer, the molten brazing alloy can flow easily for effective wetting and bond formation. Joining surfaces are usually cleaned by grinding and/or cleaning with solvents. Here we used acid etching for preparation of the joining surfaces.

Surface Preparation of Titanium Plates

For oxide removal from titanium, plates were immersed in a solution of acid mixture ($HNO_3$: HF (1:3)) or 15 minutes. The titanium plates were then washed with copious amounts of DI water, and then with hot water (to accelerate drying). Oxide removal was performed just prior to the deposition of nanomaterials.

Surface Preparation of the Brazing Alloy Sheets

The brazing alloy sheets were cut into the required size, and were cleaned in acetone for 15 minutes through sonication. Surfaces were cleaned just prior to deposition of L-CuCNT.

Dispersion and Solvent-Casting of Nanomaterials 0.2 g of copper nanoparticles (CuNP) was dispersed in 20 ml of ethanol via sonication. These dispersions were freshly prepared just before deposition. CuNP was used here as a processing aid to improve the interactions between CNT and molten brazing alloy. During deposition, the dispersion was left in a sonicator bath to avoid any agglomeration and maintain the uniformity of dispersion.

20 mg of L-CuCNT was mixed with 10 mL of IPA (0.2 weight percent), and the mixture was sonicated over three hours for thorough dispersion of nanotubes. The dispersion was separated from the residue by centrifuging over 30 minutes, and the top layer was used in the deposition process. Between depositions, the dispersion was kept in the sonicator bath to avoid agglomerations of nanomaterials.

Solvent-casting was employed for deposition of the CuNP/L-CuCNT mat on the brazing alloy sheets (Cusil® or Cusil ABA®). This process comprised the following steps: (i) introduction of CuNP dispersion in ethanol; (ii) evaporation of the solvent through heating to 60° C.; (iii) introduction of L-CuCNT dispersion in IPA; and (iv) evaporation of the solvent through heating to 60° C. These four steps produced a bilayer of CuNP/L-CuCNT, and they were repeated to produce different nanomaterial mat thicknesses on the brazing alloy sheets.

Fabrication of Nano-Engineered Joints Via Brazing

Figure 6:
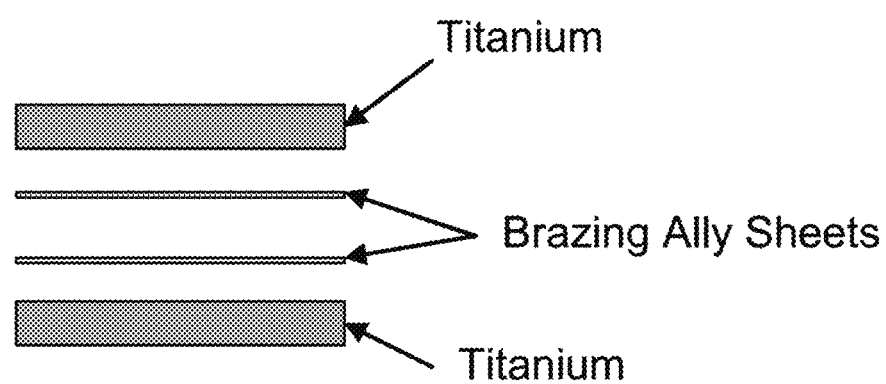
FIG. 6. Schematic Drawing of the Assembly of the Joint.

Two Cusil® brazing alloy sheets coated with nanomaterials were sandwiched between two titanium plates (FIG. 6), and the assembly was pressed with the nanomaterial deposits facing each other within a stainless steel clamp. The pressed set-up was heated in a vacuum furnace to form a brazed joint.

Mechanical Evaluation of Joints

Figure 7:
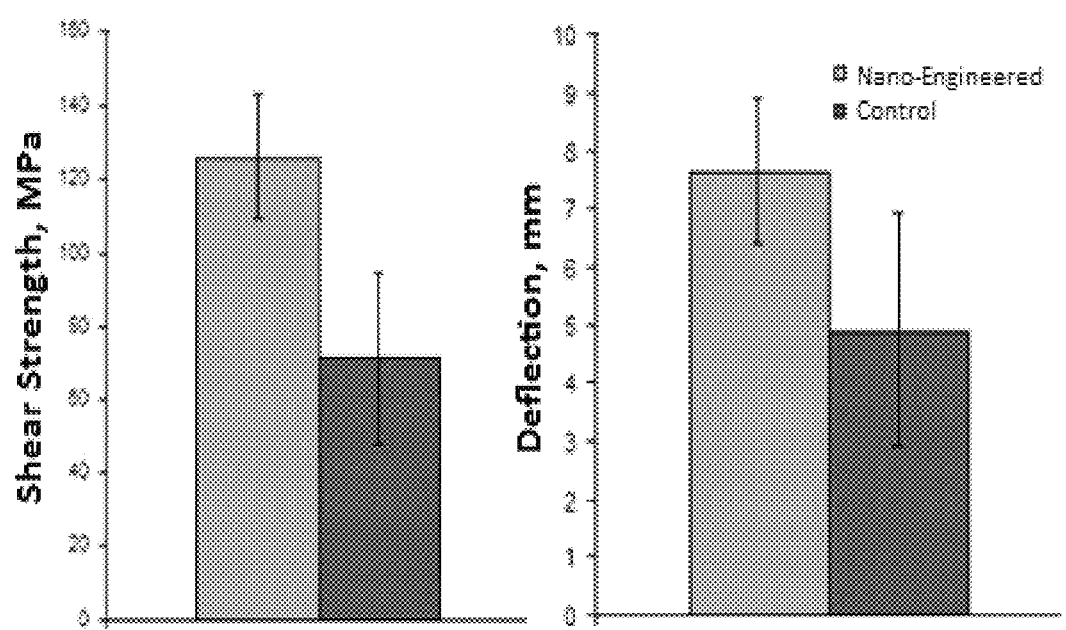
FIG. 7. Mean values and standard deviations of the shear strength and deformation capacity test results for nano-engineered joints (with 2 micrometer thick CNT mat at the interface) and control joints.

Single-lap shear tests were performed on brazed joints with bilayers of (CuNP/L-CuCNT) deposited on brazing alloy sheets. The shear load-deflection behavior of nano-engineered joints was compared with that of control joints which were processed similarly with two brazing alloy sheets but without any nanotube deposits. FIG. 7 compares the shear strength and deformation capacity of a nano-engineered joint (fabricated with ~2 μm nanomaterial mat thickness) versus a control joint fabricated similarly except that the hybrid nanomaterial deposition was not introduced at the interface. Nano-engineered joints provided higher levels of shear strength and deformation capacity when compared with the control joints. The mean values (and standard deviations) of single-lap shear test results indicated (FIG. 7) that nano-engineered joints provided shear strengths and deformation capacities that were about 70% greater than those provided by control joints.

Example 5

Stability of High-Temperature Titanium-to-Titanium Nano-Engineered Joints Under Temperature Cycles Temperature cycles induce thermo-mechanical effects which, when repeated, can cause damage to the joint area and joined components. The conformable nano-engineered joints are expected to accommodate the property and thermal expansion mismatches of the joined components, thereby controlling the thermal stresses and thus the damaging effects of temperature cycles. In order to test this hypothesis, nano-engineered and control joints were subjected to temperature cycles, and the effects on the shear load-deflection behavior of joints were evaluated.

Figure 8:
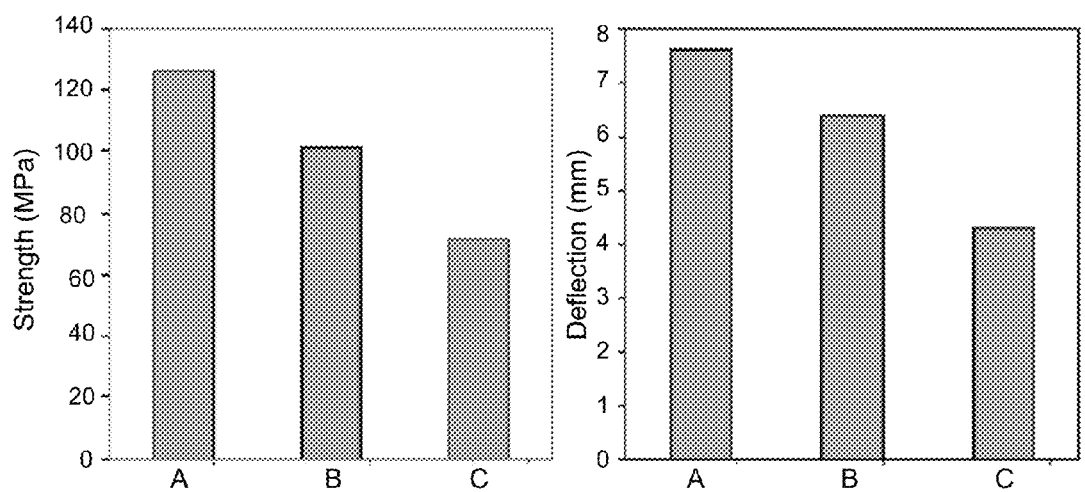
FIG. 8. Effects of temperature cycles on the shear strength and deformation capacity of nano-engineered (with 2 micrometer thick CNT mat at the interface) and control joints. A, B and C correspond to as-produced nano-engineered joints, nano-engineered joints after exposure to temperature cycles and control joints, respectively.

Titanium-to-titanium nano-engineered joints were fabricated as described in Example 4. Nano-engineered joints and control joints were exposed to twelve temperature cycles, after which they were subjected to single-lap shear tests. Each temperature cycle involved heating from 200° C. to 600° C. followed by immediate cooling from 600° C. to 200° C. The shear strength and deformation capacity of nano-engineered joints were about 70% larger than those of control joints after exposure to temperature cycles (FIG. 8).

The invention claimed is:

1. A method of joining two or more articles via slender nanomaterials embedded in a joining medium and interlinked together, the method involving:
   (i) dispersion of nanomaterials comprising at least one of carbon nanotubes and nanofibers within a solvent, with the weight percent of said nanomaterials relative to the solvent ranging from 0.001% to 10%, where surfaces of said nanomaterials are modified in order to facilitate their dispersion and promote their interfacial interactions;

(ii) application of a coating of said solvent incorporating dispersed nanomaterials on at least one of the surfaces of at least two sheets of the joining medium using at least one of spraying and casting methods, with said sheets of the joining medium made of at least one of brazing alloys, thermoplastics and thermoset precursors, and heating the applied solvent incorporating nanomaterials in order to evaporate the solvent;

(iii) insertion of said sheets of the joining medium between joining surfaces of said articles, with at least one surface coated with nanomaterials interfacing the two sheets;

(iv) pressing the joining surfaces with sheets inserted between them against each other, and heating the joining surfaces in order to liquefy the joining medium to wet the joining surfaces of said articles, partially or fully embed the nanomaterials within the liquefied medium, and develop at least one of physical and chemical bonds with the surfaces of joining articles and nanomaterials; and (v) cooling the joining surfaces of said articles in order to form a solid joining medium that is bonded to the joining surfaces of said articles, and is enhanced by interlinked nanomaterials which are partially or fully embedded in and bonded to said joining medium.

2. The method of claim 1, wherein said articles are made of at least one of metals, metal matrix composites, ceramics, ceramic matrix composites, polymers, polymer matrix composites, and carbon.

3. The method of claim 1, wherein said dispersed nanomaterials used herein are at least one of carbon nanotubes, carbon nanofibers, metal coated carbon nanotubes, and metal coated carbon nanofibers.

4. The method of claim 1, wherein said nanomaterials are modified by at least one of chemically bonded functional groups and coatings applied via electroless deposition.

5. The method of claim 4, wherein said functional groups are at least one of hydroxyl and carboxyl groups.

6. The method of claim 4, wherein said coatings comprise at least one of copper, nickel and silver.

* * * * *